United States Patent [19]
Daigle et al.

[11] Patent Number: 5,285,065
[45] Date of Patent: Feb. 8, 1994

[54] NATURAL GAMMA RAY LOGGING SUB

[76] Inventors: Robert A. Daigle, 108 Winbourne, Scott, La. 70583; Dave M. Tumlin, 1037 Jolie Blonde Rd., Breaux Bridge, La. 70517

[21] Appl. No.: 930,333

[22] Filed: Aug. 17, 1992

[51] Int. Cl.⁵ .............................................. G01N 23/00
[52] U.S. Cl. ..................................... 250/303; 250/260; 378/60
[58] Field of Search ................. 250/303, 260, 308; 378/60

[56] References Cited
U.S. PATENT DOCUMENTS

| | | | |
|---|---|---|---|
| 2,320,643 | 6/1943 | Neufeld | 250/260 |
| 2,549,109 | 4/1951 | McPhee | 250/260 |
| 3,835,317 | 9/1974 | Vann | 250/303 |
| 3,962,412 | 6/1976 | Wolfangel | 250/303 |
| 4,436,996 | 3/1984 | Arnold et al. | 250/256 |

*Primary Examiner*—Bruce C. Anderson
*Attorney, Agent, or Firm*—Robert N. Montgomery

[57] ABSTRACT

A natural gamma tag marking materials for sub or permanent markers used in gamma logging operations, such natural gamma materials having a gamma count of between 200 and 1000 counts per second. The instant invention further discloses a typical Sub, for insertion in a drilling operation, utilizing natural gamma element compounds which are considered to be non-hazardous and effective as tag markers when used in wireline logging operations.

9 Claims, 4 Drawing Sheets

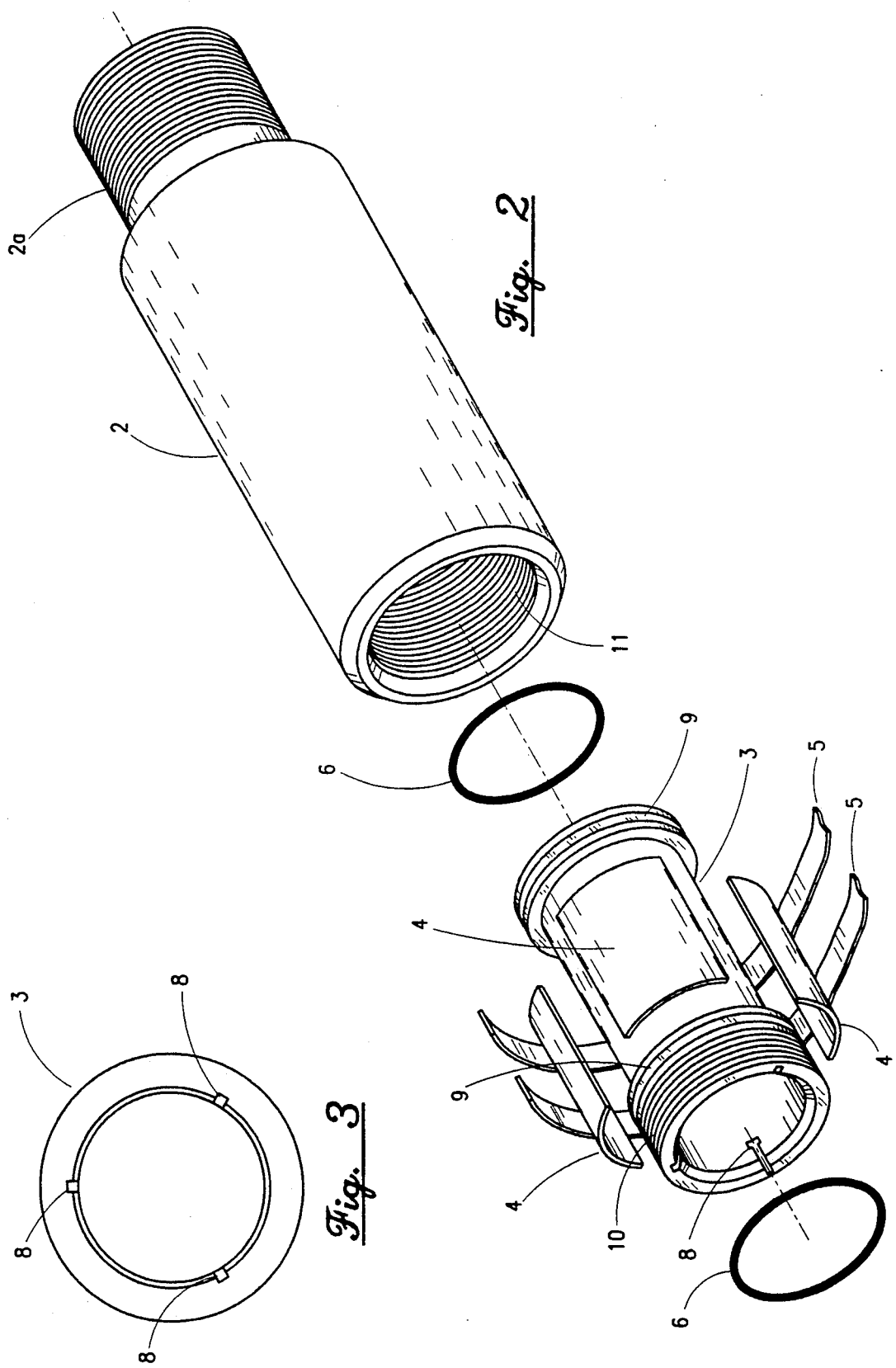

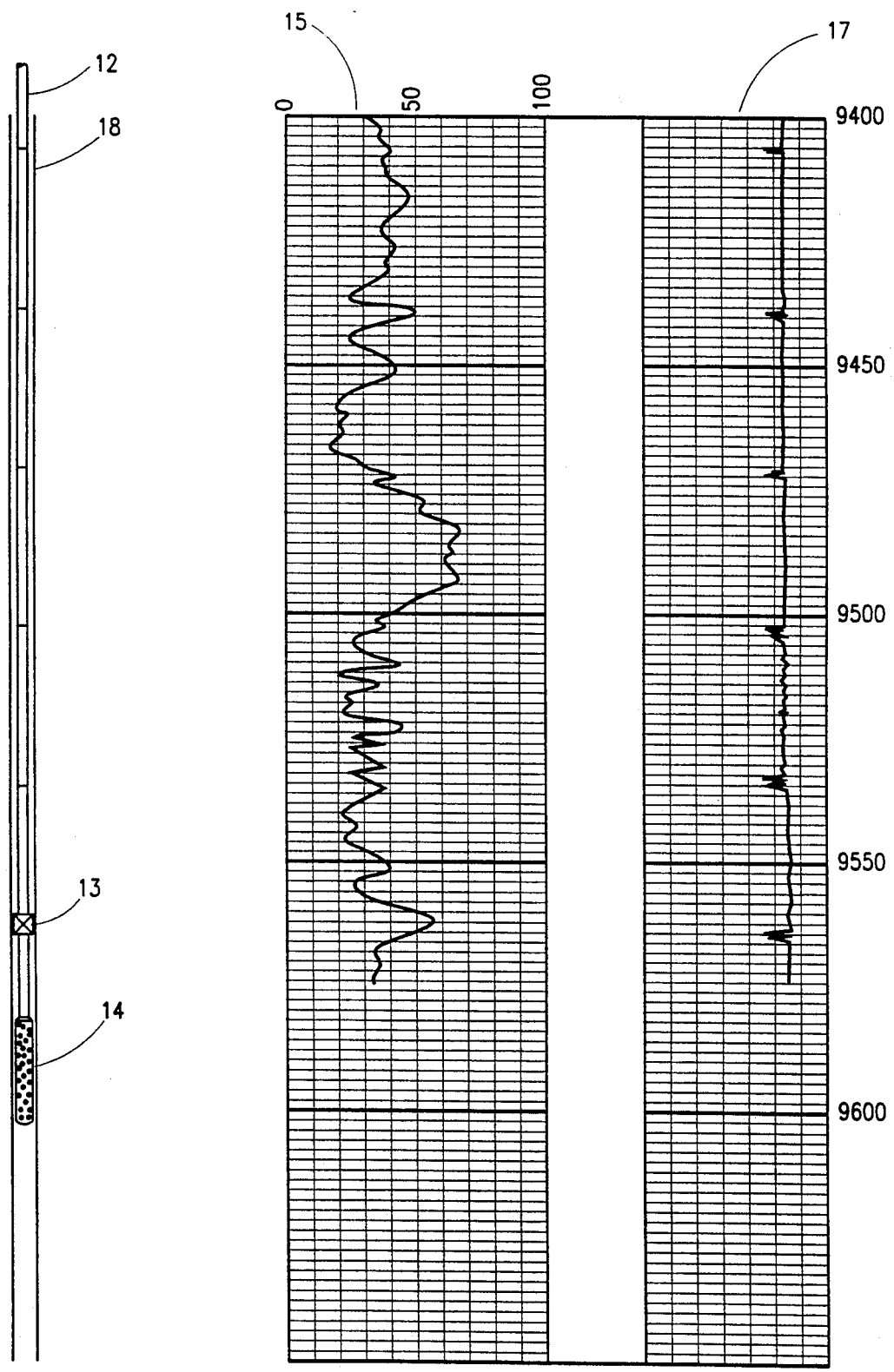

NATURAL GAMMA RAY LOGGING SUB

BACKGROUND OF THE INVENTION

1. Field of the Invention

This invention relates to a gamma radiation emitting tool joint referred to as a sub, often used in wireline logging operations as tag markers or permanent reference points in conjunction with tubing conveyed drilling tools etc. More particularly, the present invention is directed to an improved material and method of conveyance for performing such task.

2. General Background

Radioactive tag markers utilized in a drilling operation are by no means new. However, they have evolved over the years, from permanent markers placed in the casing or tubing, to cobalt pellets implanted into a drilling tube sub. These reference markers are necessary to provide an exact known location for perforating and other such down hole operations. Although each joint of drill pipe or tubing is measured prior to insertion in the bore hole, even small measurement errors and coupling differences become cumulative over the hundreds of joints of pipe used in the string, resulting in errors of several feet in some cases. Stretch and bounce in the wireline while logging the well also plays a large role in drilling tool location error. Therefore, it has been the accepted practice to provide a highly radioactive substance as a detectable tag marker referencing source, located in the near vicinity of the tool joint. Thus, when the initial subsurface formation log is compared to a through tubing wireline log, for any given well, in which a tag marking reference source has been placed near the tool joint, a high gamma count spike is detectable and can be accurately located utilizing the standard API gamma ray tubing collar locator scale.

It has been assumed in the past that the radioactive tag marker reference source must have a high gamma count to overcome the natural gamma radiation being emitted by the surrounding subsurface formations. Therefore, high gamma count elements such as cobalt with gamma counts in excess of 3600 counts/sec. are currently being used. High radiation elements, when used in well logging operations, are highly controlled by the Nuclear Regulatory Commission, the Department of Transportation and various environmental agencies, both Federal and State. Personnel must be highly trained and a paper trail must be maintained at all times for the handling of such materials to minimize human exposure to radiation. A license must also be acquired and maintained for each state through which the material passes and expensive equipment must be utilized in the handling and detection process. The necessary equipment can not be transported quickly by air, if at all, due to these time consuming restrictions. Accordingly, there is a need for a gamma ray tag marker that can be detected by the wireline logging operation which does not exhibit the draw backs hereabove mentioned. Namely, a less hazardous substance that can be handle without risk to personnel.

SUMMARY OF THE PRESENT INVENTION

It is the first object of the instant invention to provide a natural gamma emitter sub to be placed in the drill string in the near proximity of the perforating tool.

It is an other object of the instant invention to provide a natural gamma emitter sub which is detectable by the gamma wireline logging operation when passing through the joints of a drill string.

It is a further object of the instant invention to provide a natural gamma emitter sub that is both personnel safe and non-controlled by the N.R.C., E.P.A. or D.O.T.

It is still further object of the instant invention to provide a natural gamma emitter sub with a gamma count of between 200–1000 gamma counts/sec.

In the preferred embodiment it has been found that a gamma count of 200–1000 gamma counts per second is sufficient to overcome the surrounding subsurface formations normally found in the Gulf of Mexico. Such formations seldom exceed average gamma counts of 10 to 90 gamma ray counts per second. Therefore, it is unnecessary to use higher gamma emitting radioactive materials than the situation requires.

Almost all the naturally occurring radioactivity that is detectable by the gamma-ray log operation comes from the three elements: potassium, thorium, and uranium. All of which are controlled elements in their pure form. However, it has been found that various compounds, containing such natural gamma trace elements as uranium, potassium and thorium as there primary ingredient, are readily available and commonly marketed for other purposes. Such compounds have been discovered as viable substitutes as natural gamma tag markers. i.e. Hydroxides and Nitrates of compounds containing elements like Thorium, Cerium, Aluminum, Magnesium and Calcium. These compositions are considered safe when stored or shipped in small quantities. Such compounds can be prepared having the desired properties or simply purchased off the shelf and coding the sub with the gamma count specification.

BRIEF DESCRIPTION OF THE DRAWINGS

FIG. 2 is an exploded view of the tag marker pipe sub assemble.

FIG. 3 is an end view of item 3 shown in FIG. 2 showing installation and removal tool notches.

FIG. 4 is a schematic side view of a drill string utilizing a packer and perforator tool.

FIG. 5 is an initial subsurface gamma log and tubing collar locator.

DETAILED DESCRIPTION OF THE PREFERRED EMBODIMENT

Figure 1:
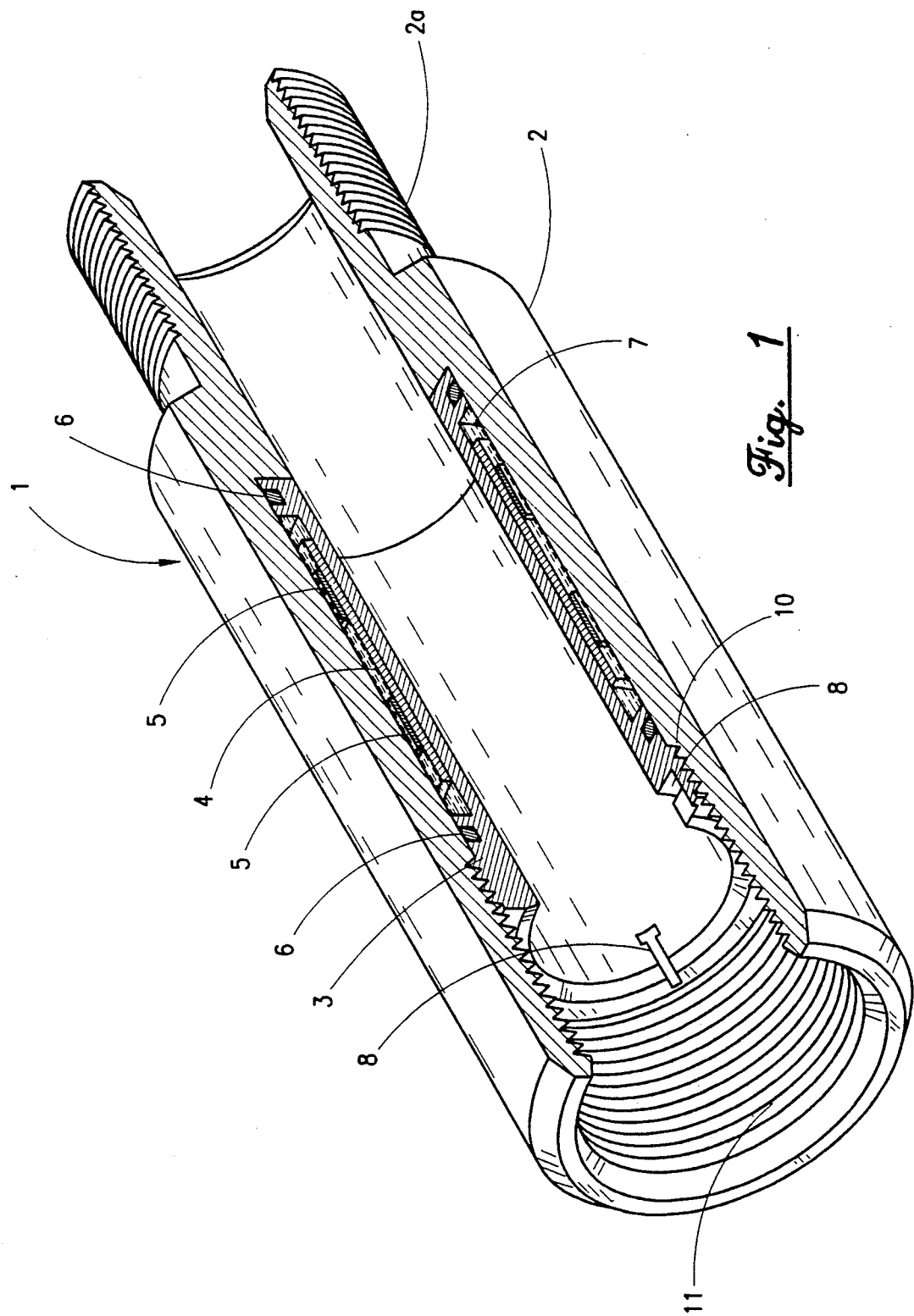
FIG. 1 is an isometric quarter section view of an embodiment of the tag marker pipe sub assemble.

An illustrative embodiment of a method of providing a low radiation natural gamma tag marker is shown in FIG. 1 in the form of a sub joint assembly 1 inserted into the drill string 12. The sub tool assembly 1 comprises a sub joint body 2 for coupling into the drill string 12 having a box end with tapered internal threads 11 and a pin end with tapered external threads 2a and a inner sleeve 3 serving as a carrier for the gamma ray emitting material 4. The inner sleeve 3 as better seen in FIG. 2 is grooved 9 at each end to receive o-ring seals 6 and is further externally threaded 10 to cooperate with the internal threads 11 provided in the sub joint body 2 thereby forming a cavity between the body 2 and the inner sleeve 3. The inner sleeve 3 is installed by a three toed spanner tool positioned in the mating notches 8 provided at one end of the sleeves inside wall as seen in FIG. 3. The natural gamma count emitting material contained in cellophane packets 4 are held securely to the recessed portion of the inner sleeve 3 by teflon tape 5. At assembly, the inner sleeve 3 is inserted into the sub joint body 2 while submerged in oil 7 allowing some quantity of such oil to be trapped in the cavities around the gamma emitting material packets 4 thereby purging it of air and thus, reducing hydrostatics.

Figures 6, 7:
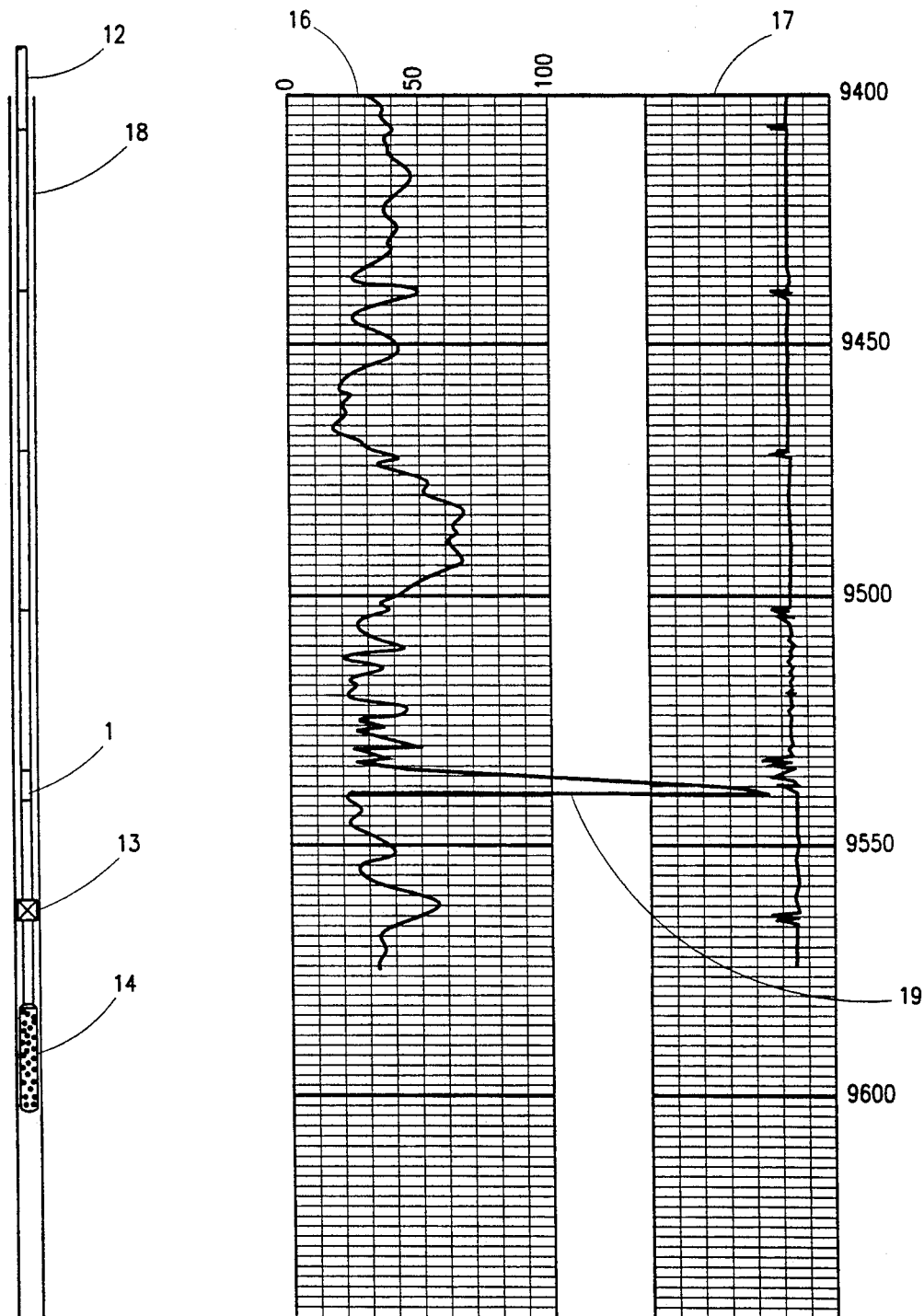
FIG. 6 is a schematic side view of a drill string utilizing a tag marker, packer and perforator tool.
FIG. 7 is a through tubing subsurface gamma log with tubing collar locator showing gamma count spike created by the tag marker.

To use the natural gamma sub 1 it is simply placed in the tubing string at the next joint above what ever tool joint is being used. When perforating, the natural gamma sub would be placed at the joint adjacent to the packer tool 13 which is directly above the perforator tool 14 as shown in FIG. 6. In this manner when the initial casing well log chart 15 as shown in FIG. 5 is compared by over laying the through tubing log chart 16 for the same well, the exact depth of the natural gamma sub is highlighted by the sharp gamma count spike 19 as referenced on the tubing collar locator track 17 as seen in FIG. 7. By knowing the exact measurement from the natural gamma sub 1 to the top shot of the perforator tool 14, the perforator's precise location in the casing 18 is determined. As can be seen in FIG. 5 with the average gamma count of the surrounding subsurface formations less than 100 counts per second, a sub, such as the present invention, placed in the string with a known emission rate in excess or 100, would be sufficient for tag marking, in most cases.

It must be understood that although it is obvious that any gamma emitting substance can be used as a tag marker as described herein. However, heretofore it has not been acknowledged that such natural low gamma count emitting materials were commercially available and could be utilized in a satisfactory and safe manner for tag marking under such conditions.

It should also be understood that the preferred embodiment as described herein may not be the only method of delivery possible. The sub's design may vary, based on the job requirements, the particular substance used and the form in which it is commercially available.

What is claimed is:

1. A natural gamma count emitting tag marking sub, comprising:
    a) a threaded body, having a box end with internal tapered threads and a pin end with external tapered threads, for threadably coupling into a down-hole tubing string; and
    a natural gamma emitting compound, having a gamma count between 200 and 1000 counts per second, contained within said threaded body.

2. A natural gamma tagging sub as defined in claim 1 wherein said natural gamma material is a hydroxide or nitrate taken from a compound whose primary element is chosen from the group consisting of potassium, thorium, and uranium.

3. A natural gamma tagging sub as defined in claim 1 wherein said threaded body further comprises: an inner sleeve, threadably secured therein having a sealing means at either end and a recessed portion therebetween, for containing said natural gamma emitting compound.

4. A natural gamma tagging sub as defined in claim 3 wherein said sealing means is an o-ring located at each end of said inner sleeve.

5. A natural gamma tagging sub as defined in claim 3 wherein said inner sleeve is purged of air during installation with said threaded body by submerging in oil.

6. A natural gamma count emitting tag marking sub, comprising
    a) a body, having a box end with internal tapered threads and a pin end with external tapered threads, for threadably coupling into a down-hole tubing string;
    b) an inner sleeve, threadably secured within said box end;
    c) a natural gamma emitting compound, having a gamma count between 200 and 1000 counts per second, contained between the walls of said body and said inner sleeve.

7. A natural gamma tagging sub as defined in claim 6 wherein said body's inner sleeve further comprises:
    a) a tubular, having external threads at one end;
    b) an external sealing means, adjacent said external threads and at the opposite end, for sealing said inner sleeve within said body;
    c) a recessed portion, located between said sealing means; and
    d) mating notches, located internally at the externally threaded end of said tubular for removal of said inner sleeve.

8. A natural gamma tagging sub as defined in claim 7 wherein said sealing means is an o-ring located at each end of said inner sleeve thereby forming a recess therebetween.

9. A natural gamma tagging sub as defined in claim 8 wherein said cavity is purged of air when said body and said inner sleeve are threadable engaged while submerged in oil.

* * * * *